US008005211B2

(12) United States Patent
Furukawa

(10) Patent No.: US 8,005,211 B2
(45) Date of Patent: Aug. 23, 2011

(54) SHUFFLE-DECRYPTING LEGITIMACY CERTIFYING APPARATUS AND METHOD, SHUFFLE-DECRYPTING VERIFYING APPARATUS AND METHOD, PROGRAM, AND RECORDING MEDIUM

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1030 days.

(21) Appl. No.: 11/885,138

(22) PCT Filed: Jan. 6, 2006

(86) PCT No.: PCT/JP2006/300068
§ 371 (c)(1),
(2), (4) Date: Aug. 27, 2007

(87) PCT Pub. No.: WO2006/092909
PCT Pub. Date: Sep. 8, 2006

(65) Prior Publication Data
US 2008/0144813 A1    Jun. 19, 2008

(30) Foreign Application Priority Data
Feb. 28, 2005  (JP) ................................ 2005-054087

(51) Int. Cl.
*H04K 1/00* (2006.01)
(52) U.S. Cl. .......................................... 380/30; 380/28
(58) Field of Classification Search ................... 380/28, 380/30
See application file for complete search history.

(56) References Cited

U.S. PATENT DOCUMENTS

| | | | |
|---|---|---|---|
| 6,092,051 A * | 7/2000 | Kilian et al. ..................... 705/12 |
| 2001/0024501 A1 * | 9/2001 | Furukawa ........................ 380/28 |
| 2002/0007457 A1 * | 1/2002 | Neff ............................... 713/180 |
| 2002/0181702 A1 * | 12/2002 | Furukawa ........................ 380/28 |

(Continued)

FOREIGN PATENT DOCUMENTS
EP    1 259 024 A2    11/2002
(Continued)

OTHER PUBLICATIONS

Jun Furukawa, et al., "Efficient and Verifiable Shuffling and Shuffle-Decryption", IEICE Transactions on Fundamentals of Electronics, Communications and Computer Sciences, vol. E88-A, No. 1, Jan. 1, 2005, pp. 172 to 188.

(Continued)

*Primary Examiner* — Peter Poltorak
(74) *Attorney, Agent, or Firm* — Scully, Scott, Murphy & Presser, P.C.

(57) ABSTRACT

The present invention is aimed at performing shuffle-decrypting certification which is made more secure by not allowing any knowledge of secret information to leak when certifying the legitimacy of shuffling and decryption. A shuffle-decrypting legitimacy certifying apparatus is supplied with a plurality of encrypted texts, a public key, a decrypting secret key, and a random number, encrypts the encrypted texts with the public key, shuffles the order of the encrypted texts, generates a plurality of decrypted texts produced by decrypting the encrypted texts with the secret key, and certifies the legitimacy of the encryption, the shuffling of the order, and the decryption to a shuffle-decrypting verifying apparatus. Data to communicate with the shuffle-decrypting verifying apparatus includes a commitment of a shuffled encrypted text which is an encrypted text produced by encrypting the encrypted texts with the public key and shuffling the order thereof.

9 Claims, 5 Drawing Sheets

U.S. PATENT DOCUMENTS

2004/0114763 A1* 6/2004 Sako et al. .................. 380/277

FOREIGN PATENT DOCUMENTS

| EP | 1 361 693 A1 | 11/2003 |
|---|---|---|
| JP | 08-263575 | 10/1996 |
| JP | 11-249560 | 9/1999 |
| JP | 2000-216774 | 8/2000 |
| JP | 2001-251289 | 9/2001 |
| JP | 2002-237810 | 8/2002 |
| JP | 2002-344445 | 11/2002 |

OTHER PUBLICATIONS

Akira Hayashi, et al. "IEICE Transactions on Fundamentals of Electronics, Communications and Computer Sciences," vol. E88-A, No. 1, Jan. 1, 2005, pp. 172 to 188.

Jun Furukawa, "Efficient, Verifiable Shuffle Decryption and Its Requirement of Unlinkability," PKC 2004, LNC 2947, 2004, pp. 319-332.

* cited by examiner

RELATED ART(1):CERTIFIED SHUFFLING

RELATED ART(2):CERTIFIED DECRYPTING

CERTIFIED SHUFFLE-DECRYPTING
METHOD OF COMBINED RELATED ART

SHUFFLE-DECRYPTING LEGITIMACY CERTIFYING APPARATUS AND METHOD, SHUFFLE-DECRYPTING VERIFYING APPARATUS AND METHOD, PROGRAM, AND RECORDING MEDIUM

CROSS REFERENCE TO RELATED APPLICATIONS

The present application is the national phase of PCT/JP2006/300068 filed Jan. 6, 2006 which claims priority from Japanese application 2005-054087 filed in Japan on Feb. 28, 2005.

TECHNICAL FIELD

The present invention relates to the art of certified shuffling and the art of certified shuffle-decrypting for use in constructing an anonymous communication path.

BACKGROUND ART

[Related Art (1)]

The certified shuffling technology of the related art includes the invention disclosed in JP-A No. 2001-251289, for example. FIG. 1 shows an arrangement described in the above publication. In the drawings accompanying the present application, arrows that are joined together mean that all of information from the sources of the arrows are put together and sent to the destination of the arrows, and arrows that are branched mean that all or part of information from the sources of the arrows are sent to the destinations of the arrows. Re-encryption shuffle referred to in the above publication is called shuffle in the present specification.

In FIG. 1, encrypted text and public key 100 is input to shuffling step 101 where it is shuffled. Encrypted text and public key 100 that is input and shuffling information 102 which specifies the shuffling are sent to identical conversion certifying step 103, and shuffling information 102 is sent to substitution certifying step 104. Identical conversion certifying step 103 generates and outputs identical conversion certifying text 105, and at the same time sends random number 106 used to generate identical conversion certifying text 105 to substitution certifying step 104. Substitution certifying step 104 outputs substitution certifying text 107. Response generating step 108 is supplied with identical conversion certifying text 105, substitution certifying text 107, the encrypted text, public key 100, and shuffled encrypted text 109, adds a response to identical conversion certifying text 105, substitution certifying text 107, and the encrypted text to generate shuffle certifying text 110, and outputs shuffle certifying text 110.

In combination with the response, identical conversion certifying text 105 certifies that it has the knowledge of shuffling of the order of input texts and the converted contents of encrypted texts, and also that if an input encrypted text comprises elements of a plurality of integers, then each of the elements has been encrypted depending on the shuffling of the same order. In combination with the response, substitution certifying text 107 certifies that shuffling of the order of input encrypted texts has been performed properly.

The term "shuffle" shown in FIG. 1 means that the order of input encrypted texts is shuffled and they are re-encrypted. To certify that the above process is performed properly, the above document employs two certifying steps, i.e., the identical conversion certifying step and the substitution certifying step. The document achieves efficient generation of a shuffle certifying text by dividing objects to be certified.

[Related Art (2)]

The description of JP-A No. 08-263575, for example, is referred to with respect to the certified decryption technology of the related art. FIG. 2 shows an arrangement described in the above publication.

In FIG. 2, shuffled encrypted text 200 and secret key 201 are input to and decrypted by decrypting step 203. Shuffled encrypted text 200 and secret key 201 that are input and also decrypted text 204 that has been decrypted therefrom are sent to decryption certifying step 205. Decryption certifying step 205 outputs decryption certifying text 206 from these items of information.

The term "decryption" means that an encrypted text is partly decrypted using some of the secret keys that are owned discretely. The encrypted text is completely decrypted by repeating decryption using all the secret keys.

[Related Art (3)] (A Certified Shuffle-Decrypting Method of the Related Art)

A certified shuffle-decrypting method can be achieved by combining related art 1 and related art 2.

FIG. 3 shows a certified shuffle-decrypting method of the related art. The certified shuffle-decrypting method is accomplished simply by combining related art 1 and related art 2.

Encrypted text and public key 301, shuffling step 302, shuffling information 303, shuffled encrypted text 304, identical conversion certifying step 307, random number 308, identical conversion certifying text 309, substitution certifying step 310, substitution certifying text 311, response generating step 312, and shuffle certifying text 313 in FIG. 3 are identical respectively to encrypted text and public key 100, shuffling step 101, shuffling information 102, shuffled encrypted text 109, identical conversion certifying step 103, random number 106, identical conversion certifying text 105, substitution certifying step 104, substitution certifying text 107, response generating step 108, and shuffle certifying text 110 in FIG. 1. Secret key 300, shuffled encrypted text 304, decrypting step 305, decrypted text 306, decryption certifying step 314, and decryption certifying text 315 in FIG. 3 are identical respectively with secret key 201, shuffled encrypted text 200, decrypting step 203, decrypted text 204, decryption certifying step 205, and decryption certifying text 206 in FIG. 2.

The method shown in FIG. 3 shows in that shuffled encrypted text 304 is included in shuffle-decrypting certifying text 316, shuffled encrypted text 304 is input to decryption certifying step 314 and is not input to response generating step 312.

[Related Art (4)]

The description of JP-A No. 2002-344445, for example, is referred to with respect to the certified shuffle-decrypting technology of the related art.

In the above publication, a shuffled encrypted text is not added to a shuffle-decrypted text. According to the invention disclosed in the above publication, an incomplete commitment of the shuffled encrypted text is added to a shuffled decrypted text. By modifying related art 1 and related art 2 for improvement, the legitimacy of shuffling and decryption can be accomplished if the commitment of the shuffled encrypted text is incomplete even when shuffled encrypted text is absent. The term "incomplete commitment" refers to a commitment wherein information of an object to be committed, i.e., the shuffled encrypted text, partly leaks. It is thus possible to attack the encryption system using the data that has leaked.

DISCLOSURE OF THE INVENTION

Problems to be Solved by the Invention

The related art described above suffers the following problems:

A communication path will be reviewed which shuffles an input encrypted text, decrypts the shuffled text, outputs a decrypted text, and generates and outputs a text certifying the legitimacy of the above process. Such a communication path can be provided (related art 3) by successively employing related art 1 and related art 2. According to this scheme, the legitimacy cannot be verified unless a shuffled encrypted text, that is unwanted information, is output. The shuffled encrypted text causes part of the knowledge of a secret key used for decryption to leak. If this communication path is used as part of an encryption system, then the security of the encryption system may not possibly be maintained due to the knowledge that has leaked.

Related art 4 is successful in reducing the amount of leaked knowledge by adding an incomplete commitment of the shuffled encrypted text without adding the shuffled encrypted text to the certifying text. However, part of the knowledge still leaks in Related Art 4 and this art does not provide complete permutation and concealment of decryption.

The present invention has been made in view of the above problems. It is an object of the present invention to provide a shuffle-decrypting verifying method which is made more secure by not allowing any knowledge of secret information to leak when certifying the legitimacy of shuffling and decryption, and an apparatus based on the shuffle-decrypting verifying method. The method provided by the present invention makes it possible to construct an anonymous communication path having a higher anonymity.

Means for Achieving the Object

According to the present invention, there is provided a shuffle-decrypting legitimacy certifying apparatus for being supplied with a plurality of encrypted texts, a public key, a decrypting secret key, and a random number, encrypting the encrypted texts with the public key, shuffling the order of the encrypted texts, generating a plurality of decrypted texts produced by decrypting the encrypted texts with the secret key, and certifying the legitimacy of the encryption, the shuffling of the order, and the decryption to a shuffle-decrypting verifying apparatus, wherein data to communicate with the shuffle-decrypting verifying apparatus includes a commitment of a shuffled encrypted text which is an encrypted text produced by encrypting the encrypted texts with the public key and shuffling the order thereof.

According to the present invention, there is also provided a shuffle-decrypting verifying apparatus for being supplied with a plurality of encrypted texts, a plurality of decrypted texts, a public key, and a random number, and verifying the legitimacy by a shuffle-decrypting legitimacy certifying apparatus of a certification indicating that the decrypted texts are data produced by encrypting the encrypted texts, shuffling the order thereof, and decrypting the encrypted texts with a secret key corresponding to the public key, wherein data to communicate with the shuffle-decrypting legitimacy certifying apparatus includes a commitment of a shuffled encrypted text which is an encrypted text produced by encrypting the encrypted texts with the public key and shuffling the order thereof.

The shuffle-decrypting legitimacy certifying apparatus may comprise:

a shuffling apparatus for being supplied with the encrypted texts, the public key, and the random number, encrypting the encrypted texts with the public key, shuffling the order of the encrypted texts, and outputting a plurality of shuffled encrypted texts produced as a result;

a decrypting apparatus for being supplied with the shuffled encrypted texts and the secret key, decrypting the shuffled encrypted texts with the secret key, and outputting a plurality of decrypted texts produced as a result; and a shuffled encrypted text commitment apparatus for being supplied with the shuffled encrypted texts and the random number, generating a commitment of the shuffled encrypted texts, and outputting a shuffled encrypted text commitment produced as a result.

The shuffle-decrypting legitimacy certifying apparatus may comprise:

a substitution certifying commitment apparatus for being supplied with the random number, generating a shuffle commitment which is a commitment with respect to a substitution representing an association between the order of the encrypted texts to be shuffled and the shuffled order of the encrypted texts and the random number for encryption, generating a substitution certifying commitment comprising the shuffle commitment and a commitment of the certification of the knowledge of the committed substitution and the committed random number for encryption, and outputting the substitution certifying commitment;

an identical conversion certifying commitment apparatus for being supplied with the encrypted texts, the public key, the commitment of the shuffled encrypted texts, and the random number, and generating and outputting an identical conversion certifying commitment which is a commitment of a certification indicating that the committed shuffled encrypted texts are generated by shuffling the encrypted texts using the substitution and the random number for encryption which are committed by the shuffle commitment;

a decryption certifying commitment apparatus for being supplied with the commitment of the shuffled encrypted texts, the decrypted texts, the secret key, and the random number, and generating a decryption certifying commitment which is a commitment of a certification indicating that the committed shuffled encrypted texts are decrypted into the decrypted texts by the secret key;

a challenge value acquiring apparatus for sending a shuffle-decrypting certifying commitment comprising the commitment of the shuffled encrypted texts, the shuffle commitment, the substitution certifying commitment, the identical conversion certifying commitment, and the decryption certifying commitment, to the shuffle-decrypting verifying apparatus, and waiting for and receiving a challenge value as a sequence of random numbers from the shuffle-decrypting verifying apparatus; and a response generating apparatus for generating a response which is represented by data that can be calculated from data including the challenge value, the random number, and the secret key, and sending the generated response to the shuffle-decrypting verifying apparatus.

The shuffle-decrypting verifying apparatus may comprise:

a challenge value generating apparatus for waiting for a shuffle-decrypting certifying commitment comprising a substitution certifying commitment including a commitment of a plurality of shuffled encrypted texts and a shuffle commitment, an identical conversion certifying commitment, and a decryption certifying commitment, to be sent from the shuffle-decrypting certifying apparatus, selecting a random number having a given length as a challenge value when the shuffle-decrypting certifying commitment is received, and sending the selected challenge value to the shuffle-decrypting certifying commitment;

a substitution verifying apparatus for being supplied with the shuffle commitment, the substitution certifying commitment, the response, and the challenge value, and for generating a verifying result indicating of either "legitimate" or "illegitimate" depending on whether the shuffle commitment is a commitment of substitution or a random number for encryption;

an identical conversion verifying apparatus for being supplied with the identical conversion certifying commitment, the encrypted texts, the commitment of the shuffled encrypted texts, the public key, the response, and the challenge value, and generating a verifying result indicating of either "legitimate" or "illegitimate" depending on whether the committed shuffled encrypted texts are shuffled using the committed substitution or the committed random number for encryption; and a decryption verifying apparatus for being supplied with the decryption certifying text, commitment of the shuffled encrypted texts, the decrypted texts, the public key, the response, and the challenge value, and generating a verifying result indicating of either "legitimate" or "illegitimate" depending on whether the committed shuffled encrypted texts are decrypted into the decrypted texts;

wherein if all the verifying results from the substitution verifying apparatus, the identical conversion verifying apparatus, and the decryption verifying apparatus represent "legitimate", then a verifying result indicating "legitimate" or "illegitimate", that represents that shuffled decrypted texts are produced, is output, and if even one of the verifying results represents "illegitimate", then a verifying result indicative of "illegitimate" is output.

A program according to the present invention enables a computer to execute the steps of the above method, and a recording medium according to the present invention stores the program.

According to the present invention thus arranged, secret information can be concealed more strongly when certifying shuffling and decryption.

Figure 1:
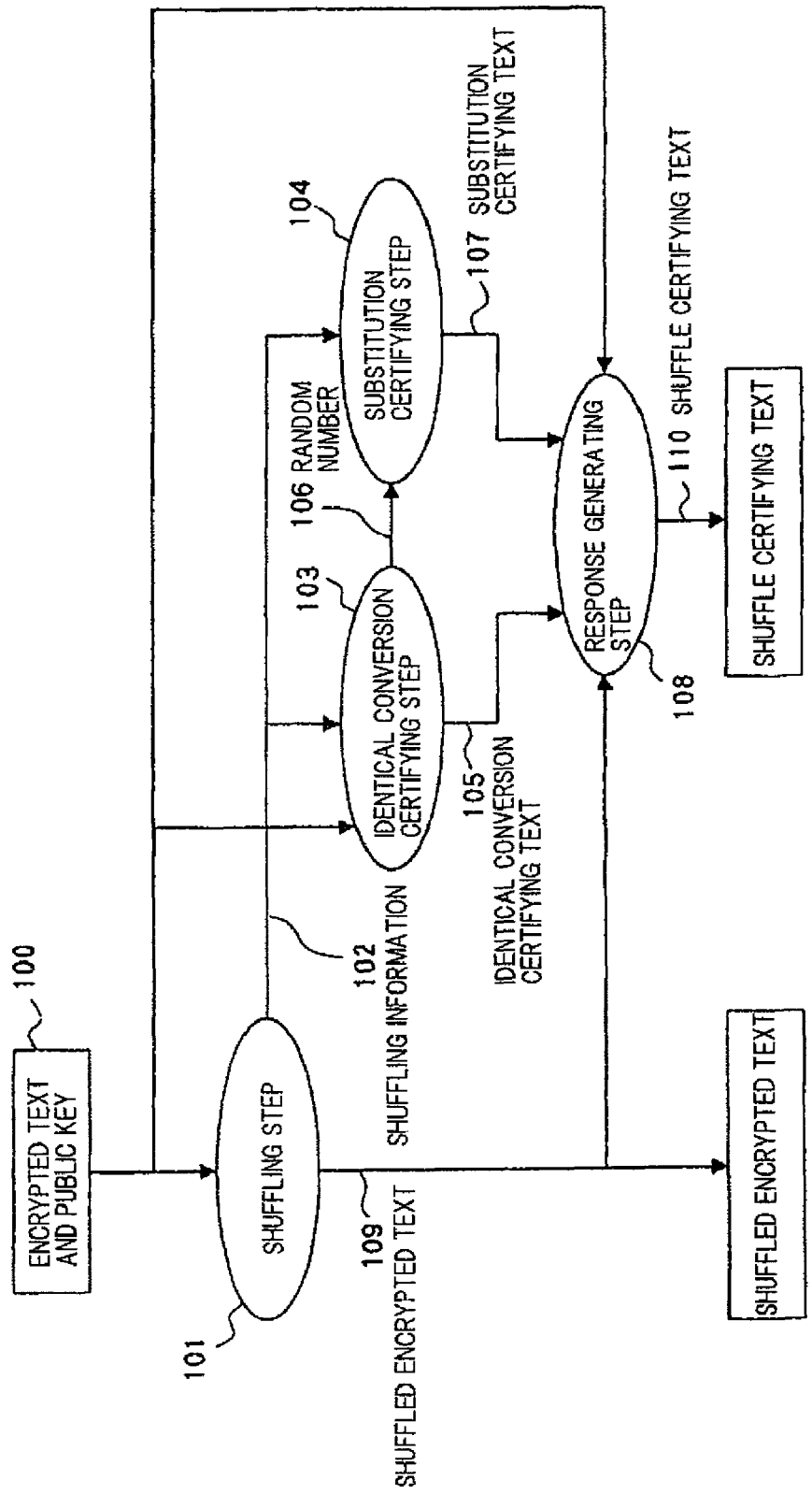
FIG. 1 is a diagram showing an arrangement of related art 1.
Figure 2:
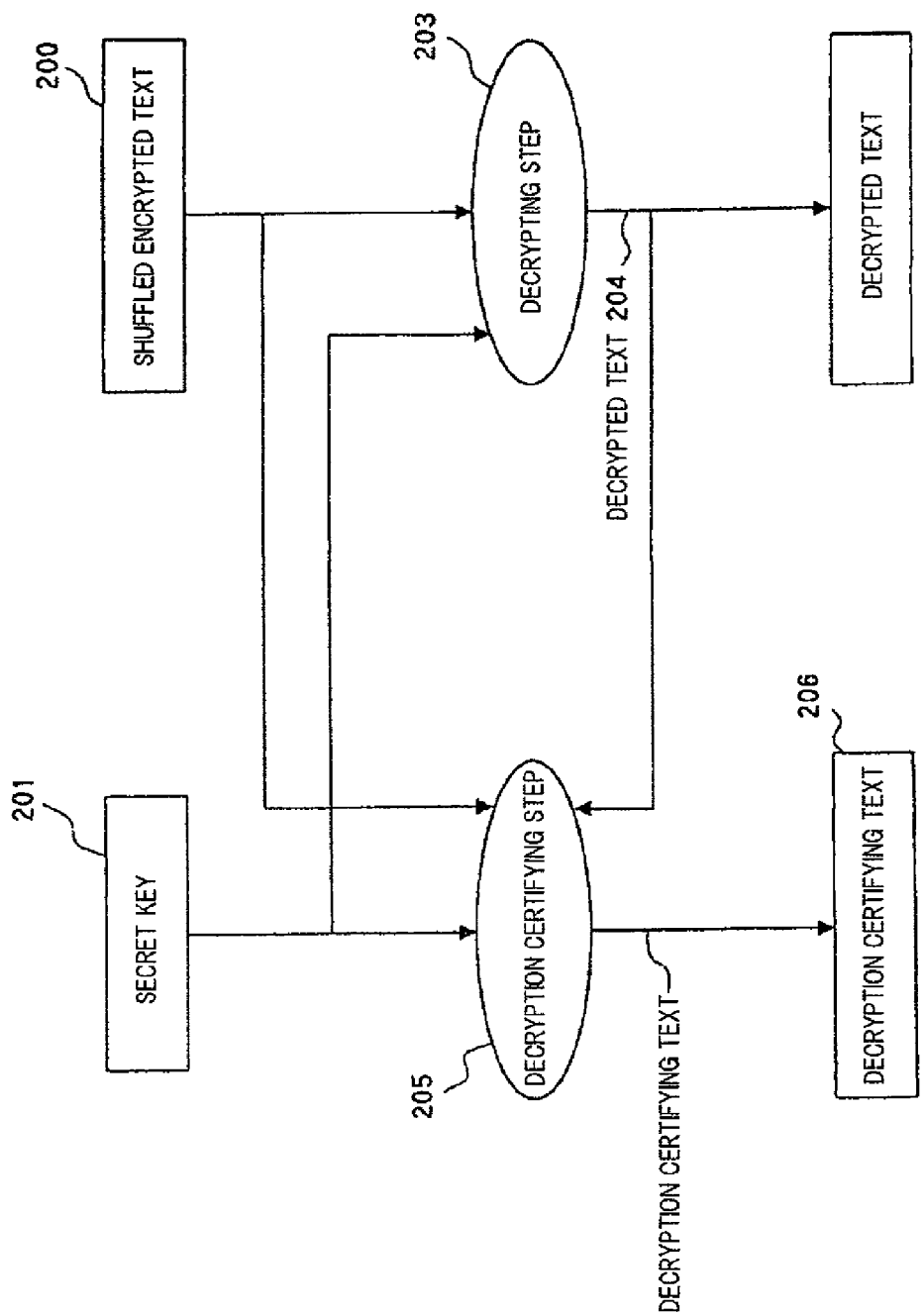
FIG. 2 is a diagram showing an arrangement of related art 2.
Figure 3:
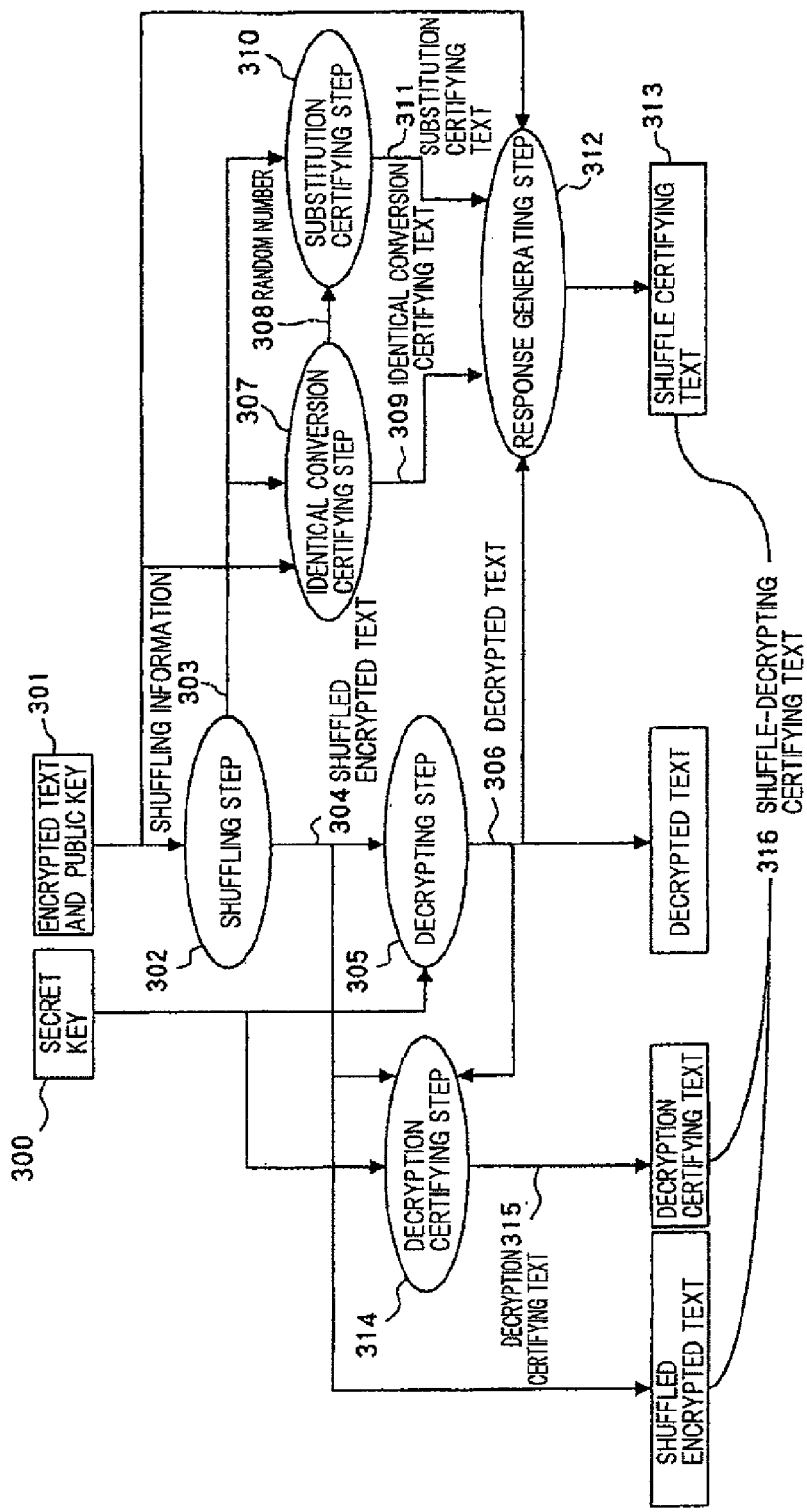
FIG. 3 is a diagram showing an arrangement of related art 3.

DESCRIPTION OF REFERENCE CHARACTERS 401 a plurality of encrypted texts
402 public key
403 random number
404 shuffled encrypted text
405 shuffling apparatus
406 decrypting apparatus
407 secret key
409 shuffled encrypted text commitment apparatus
410 shuffled encrypted text commitment
411 substitution certifying commitment apparatus
412 substitution certifying commitment
413 common reference base
414 identical conversion certifying commitment apparatus
415 identical conversion certifying commitment
416 decryption certifying commitment apparatus
417 decryption certifying commitment
419 challenge value
421 response generating apparatus
422 response
500 shuffle-decrypting verifying apparatus
501 challenge value generating apparatus
502 random number
503 substitution verifying apparatus
505 identical conversion verifying apparatus
507 decryption verifying apparatus

BEST MODE FOR CARRYING OUT THE INVENTION

Embodiments of the present invention will be described below with reference to the drawings. The embodiments will be described with reference to an example using elliptical Elgamal encryption. Matters serving as a basis for the present invention will first be described below.

[Elliptical Elgamal Public Key Encryption System]

An Elliptical Elgamal encryption system belongs to a public-key encryption system. First, it is assumed that q represents a prime number having the relationship q mod 3=2, E an elliptical curve whose order is q, $G_0$ a generating element of E, O an identity element of O. In other words, point P on any desired E satisfies [q]P=0. $[x]G_0$ expresses an x-multiplied point of $G_0$.

The elliptical Elgamal public key encryption system comprises the following three algorithms:

[Key Generating Algorithm]

A random number is input, secret keys x are selected as random elements of $Z_q$, public keys $M_0=[x]G_0$ are calculated, and secret keys x and public keys $M_0$ are output.

[Encrypting Algorithm]

Plain text M∈E and public keys $M_0$ are input, s are selected as random elements of $Z_q$, and encrypted texts are calculated as $C=(G_1, M_1)=([s]G_0, M+[s]M_0)$ and output.

[Decrypting Algorithm]

Encrypted texts c and secret keys x are input, and decrypted text $M'=M_1-[x]M_1$ is output. From $M'=M_1-[x]G_1=M+[s]M_0-[x][s]G_0=M+[s]M_0-[s]Mcl0$, It is clear that output M' of the decrypting algorithm is in agreement with encrypted plain texts M.

It is assumed that secret keys s are owned discretely. In other words, $\Sigma_{j=1}^{m} x_j \mod q$ is satisfied and each $x_j$ is individually owned. According to the present embodiment, $x_j$ is referred to as decrypting secret keys.

For completely decrypting the encrypted texts, the operation to successively subtract $[x]_j G_1$ from the value of $M_1$ calculated using each decrypting secret key is performed with respect to all j. Since only one decrypting secret key $x_m$ is handled in the present embodiment, it is expressed as x'. Public keys include $M_0$ and Y where $M_0=[x]G_0$, $Y=[x']G_0$.

[Encrypted Texts]

n encrypted texts that are input to the present system are expressed as $(G_i, M_i)_i = 1, \ldots, n$. The elements of each of the encrypted texts are elements of E.

These encrypted texts are produced by encrypting n encrypted texts $(G_i, M_i) = 1, \ldots, n$ as $([s_i]G_0+G_i, [s_i]M_0+M_i)$ (i=1, ..., n) with public key $M_0$, shuffling their order, and thereafter decrypting them with the decrypting secret keys.

[Permutation Matrix]

A permutation matrix will be described below. The permutation matrix is defined as an n-row, n-column square matrix where only a non-0 component exists in each row and each column and its value is 1 on $Z_q$. For example, the permutation matrix is given as:

0, 1, 0, 0
0, 0, 0, 1
0, 0, 1, 0
1, 0, 0, 0

Embodiments

Embodiment (1)

Shuffle-decrypting legitimacy certifying apparatus 400 according to an embodiment of the present invention will be described below with reference to FIG. 4 which shows an arrangement thereof.

Figure 4:
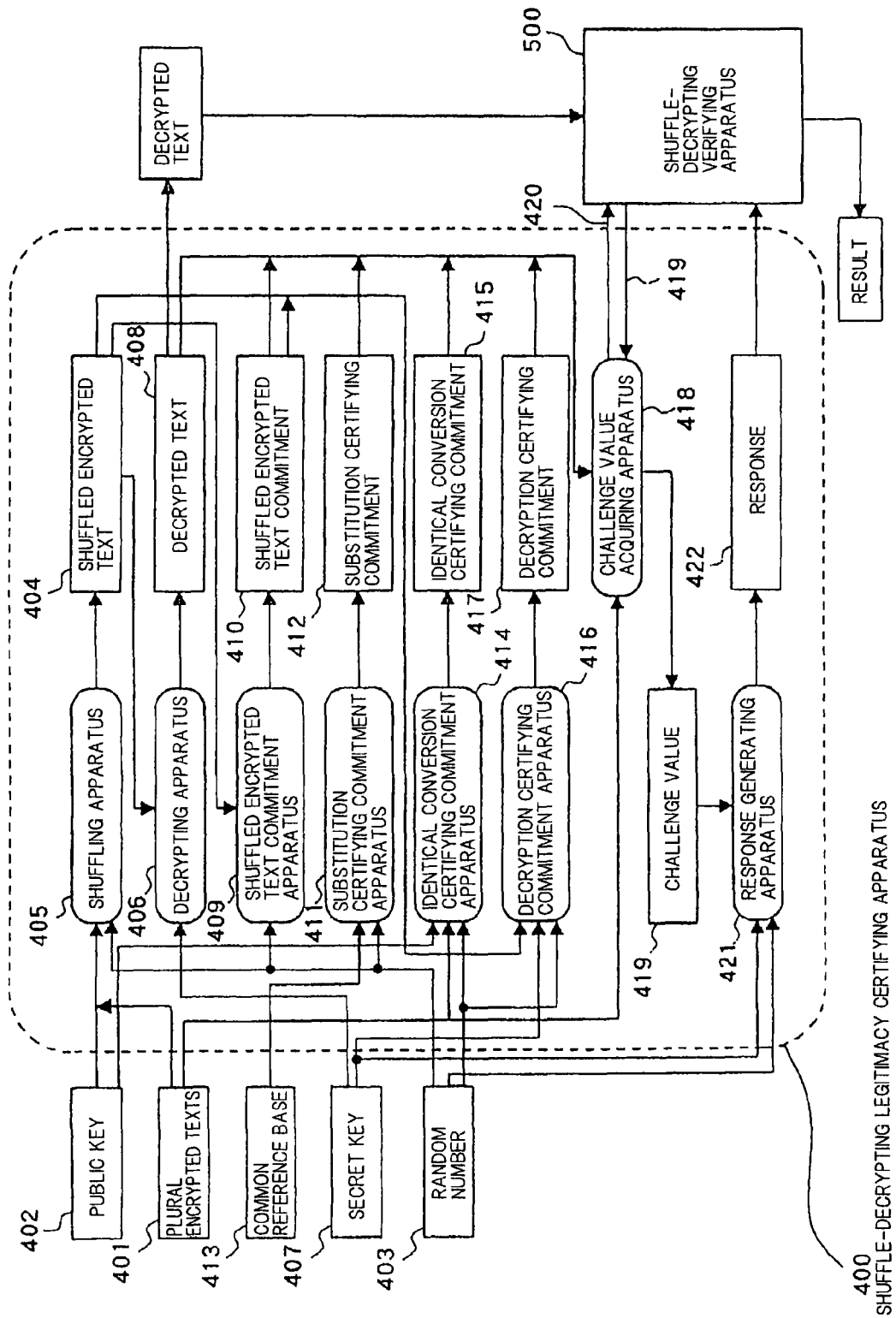
FIG. 4 is a diagram showing an arrangement of a shuffle-decrypting legitimacy certifying apparatus according to an embodiment of the present invention.

Shuffle-decrypting legitimacy certifying apparatus 400 shown in FIG. 4 is supplied with a plurality of encrypted texts 401, public key 402, random number 403, secret key 407, and common reference base 413, and outputs decrypted texts 408, shuffle-decrypting certifying commitment and response 422. Shuffle-decrypting legitimacy certifying apparatus 400 comprises shuffling apparatus 405, decrypting apparatus 406, shuffled encrypted text commitment apparatus 409, substitution certifying commitment apparatus 411, identical conversion certifying commitment apparatus 414, decryption certifying commitment apparatus 416, challenge value acquiring apparatus 418, and response apparatus 421.

It is assumed that n encrypted texts are shuffled and decrypted. A common reference base which is a point randomly selected from E, $F\mu$ ($\mu$=−4, 1, ..., n), and $M_{-1}$ are input to the apparatus according to the present invention. It is assumed that the apparatus can be used from all steps (inputs to the steps will hereinafter not be explicitly described).

Shuffle-decrypting legitimacy certifying apparatus 400 is implemented by a general computer system including an input device, an output device, a memory, and a controller. Shuffling apparatus 405, decrypting apparatus 406, shuffled encrypted text commitment apparatus 409, substitution certifying commitment apparatus 411, identical conversion certifying commitment apparatus 414, decryption certifying commitment apparatus 416, challenge value acquiring apparatus 418, and response apparatus 421 are virtually constructed in the computer system. Each of the components will be described in detail below.

[Shuffling Apparatus 405]

n encrypted texts 401 ($G_i, M_i$) (1, ..., n), public keys 402 ($G_0, M_0$), and random number 403 are input to shuffling apparatus 405.

Then, random n×n permutation matrix ($\pi_{ji}$) (i,j=1, ..., n) and random numbers $\pi_{0i}$ (i=1, ..., n)$\in Z_q$ are generated from input random number 403.

Since the permutation matrix and the random numbers are uniquely generated from input random number 403, they are considered to have been included in the input random number. In other words, when random number 403 is input to the apparatus, the apparatus can again generate data produced from a random number such as ($\pi_{ji}$) (i,j=1, ..., n) and $\pi_{0i}$ (i=1, ..., n)$\in Z_q$.

Then, shuffled encrypted text 404 ($G'_i, M''_i$) (i=1, ..., n) is calculated as ($G'_i, M''_i$)=$\Sigma_{\mu=0}^n[\pi\mu_i]G\mu, \Sigma_{\mu=0}^n[\pi\mu_i]M\mu$). It can be seen, as described below, that the shuffled encrypted text has been shuffled, i.e., encrypted and thereafter the order thereof is shuffled.

If the relationship between j and i where $\rho_{ji}$=1 is represented by $\pi(i)$=j, then ($\Sigma_{\mu=0}^n[\pi\mu_i]G\mu, \Sigma_{\mu=0}^n[\pi\mu_i]M\mu$)=($G\pi_{(i)}, M\pi_{(i)}$). Shuffling apparatus 405 outputs shuffled encrypted text 404.

[Decrypting Apparatus 406]

Shuffled encrypted text 404 and decrypting secret key 407 are input to decrypting apparatus 406. Decrypting apparatus 406 calculates decrypted texts 408 as ($G'_i, M'_i$)=($G'_i, [-x']G'_i, M''_i$) and outputs decrypted texts 408.

[Start of the Shuffle-Decrypting Certifying Apparatus]

[Shuffled Encrypted Text Full-Concealment Commitment Apparatus 409]

Shuffled encrypted text 404 ($G'_i, M''_i$) (i=1, ..., n) and random number 403 are input to shuffled encrypted text full-concealment commitment apparatus 409. Shuffled encrypted text full-concealment commitment apparatus 409 selects random $\pi_{-1i}\in Z_q$ (i=1, ..., n) from input random number 403.

Shuffled encrypted text full-concealment commitment apparatus 409 calculates commitment 410: $N_i$ (i=1, ..., n) of the shuffled encrypted text as $N_i=[\pi_{-1i}]M_{-1}+M''_i$ (i=1, ..., n) and outputs calculated commitment 410.

[Substitution Certifying Commitment Apparatus 411]

Permutation matrix $\pi_{ji}$ (i,j=1, ..., n) indicative of the shuffling of the order, random number $\pi_{0i}$ (i=1, ..., n) used for encryption, and random number 403, which are used in the shuffle apparatus, are input to substitution certifying commitment apparatus 411 [$\pi_{ji}$ (i,j=1, ..., n) and $\pi_{0i}$ (i=1, ..., n) are included in random number 403].

Common base 413 is input to substitution certifying commitment apparatus 411. Substitution certifying commitment apparatus 411 selects random $\pi\mu_0\in Z_q$ ($\mu$=−4, ..., n), $\pi'\mu\in Zq$ ($\mu$=−4, ..., n), $\pi_{-2i}\in Z_q$ (i=1, ..., n) from input random number 403. It is assumed below that these values are also included in random number 403).

Then, substitution certifying commitment apparatus 411 calculates $\pi_{-3i}=\Sigma_{j=1}^n 3\pi_{j0}^2\pi_{ji} \mod q$ (i=1, ..., n)

$\pi_{-4i}=\Sigma_{j=1}^n 3\pi_{j0}\pi_{ji} \mod q$ (i=1, ..., n)

$F'\mu=\Sigma v_{=-4}^n [\pi v\mu] Fv$ ($\mu$=0, ..., n)

$F''_0=\Sigma v_{=-4}^n [\pi'v] Fv$ $w=\Sigma_{j=1}^n \pi_{j0}^{-3} \pi_{30} - \pi'_{-4} \mod q$ where $F'_i$ (i=1, ..., n) is defined as a shuffle commitment.

Finally, substitution certifying commitment apparatus 411 outputs shuffle commitment $F'_i$ (i=1, ..., n) and $F'_0$, $F''_0$, and w as substitution certifying commitment 412.

[Identical Conversion Certifying Commitment Apparatus 414]

Permutation matrix $\pi_{ji}$ (i,j=1, ..., n) indicative of the shuffling of the order, random number $\pi_{0i}$ (i=1, ..., n) used for encryption, random number $\pi_{j0}$ (j=1, ..., n), random number $\pi_{-10}$ (j=1, ..., n) [these values are included in random number 403], n encrypted texts 401 ($G_i, M_i$) (i=1, ..., n), public keys 402 ($G_0, M_0$), and random number 403, which are used in the shuffling apparatus, are input to identical conversion certifying commitment apparatus 414.

Identical conversion certifying commitment apparatus 414 calculates $G'_0=\Sigma v_{=0}^n[\pi v_0]Gv$, $N_0=\Sigma v_{=-1}^n[\pi v_0]Mv$.

Finally, identical conversion certifying commitment apparatus 414 outputs $G'_0$, $N_0$ as identical conversion certifying commitment 415.

[Decryption Certifying Commitment Apparatus 416]

Part $G'_i$ (i=1, ..., n) of n decrypted texts 408, public keys 402 ($G_0, M_0$), random number $\pi_{-10}$, and random number 403 are input to decryption certifying commitment apparatus 416.

Decryption certifying commitment apparatus 416 selects random $t_i \epsilon Z_q$ (i=1, ..., n) from the input random numbers.

Then, decryption certifying commitment apparatus 416 calculates $Y'_i = [t_i]G_0$ (i=1, ..., n), $N' = [\pi_{-10}]M_{-1} + \Sigma i_{=1}{}^n[t_i]G'_i$.

Finally, decryption certifying commitment apparatus 416 outputs $Y'_i$ (i=1, ..., n), N' as decryption certifying commitment 417.

[Challenge Value Acquiring Apparatus 418]

Challenge value acquiring apparatus 418 sends all of shuffled encrypted text commitment 410 $N_i$ (i=1, ..., n), shuffle commitment $F'_i$ (i=1, ..., n), substitution certifying commitment 412 made up of $F'_0$, $F''_0$, w, identical conversion certifying commitment 415: $G'_0$, $N_0$, and decryption certifying commitment 417: $Y'_i$ (i=1, ..., n), as shuffle-decrypting certifying commitment 420 to shuffle-decrypting verifying apparatus 500, and waits for challenge value 419.

Challenge value acquiring apparatus 418 receives challenge value 419: $c_i \epsilon Z_q$ (i=1, ..., n).

[Response Generating Apparatus 421]

Permutation matrix $\pi_{ji}$ (i,j=1, ..., n) indicative of the shuffling of the order, random number $\pi_{0i}$ (i=1, ..., n) used for encryption, random number $\pi v_0$ ($v$=-4, ..., n), random number $\pi' v$ ($v$=-4, ..., n), random number $\pi_{-1i}$ (i=1, ..., n), random number $\pi_{-2i}$ (i=1, ..., n), random number $t_i$ (i=1, ..., n), calculated number: $\pi_{-3i}$ (i=1, ..., n), and calculated number $\pi_{-4i}$ (i=1, ..., n) are input to response generating apparatus 421. These are all included in input random number 403.

Challenge value 419: $c_i$ (i=1, ..., n) and secret key 409: x' are input to response generating apparatus 421. It is assumed below that $c_0$=1.

Response generating apparatus 421 calculates response 422: $rv$ ($v$=-4, ..., n), $r'v$ ($v$=-4, ..., n), $r''_i$ (i=1, ..., n) as $rv = \Sigma \mu_{=0}{}^n \pi v \mu c \mu \mod q$ ($v$=-4, ..., n), $r'v = \Sigma_{i=1}{}^n \pi v_i c_i^2 + \pi' v \mod q$ ($v$=-4, ..., n), and $r''_i = x'c_i + t_i \mod q$ (i=1, ..., n).

Finally, response generating apparatus 421 sends $rv$ ($v$=-4, ..., n), $r'v$ ($v$=-4, ..., n), $r''_i$ (i=1, ..., n) as shuffle-decrypting certifying commitment and response 422 to shuffle-decrypting verifying apparatus 500, and then finishes its operation.

[End of Shuffle-Decrypting Certifying Apparatus 400]

Embodiment (2)

Shuffle-decrypting verifying apparatus 500 according to an embodiment of the present invention will be described below with reference to FIG. 5.

Figure 5:
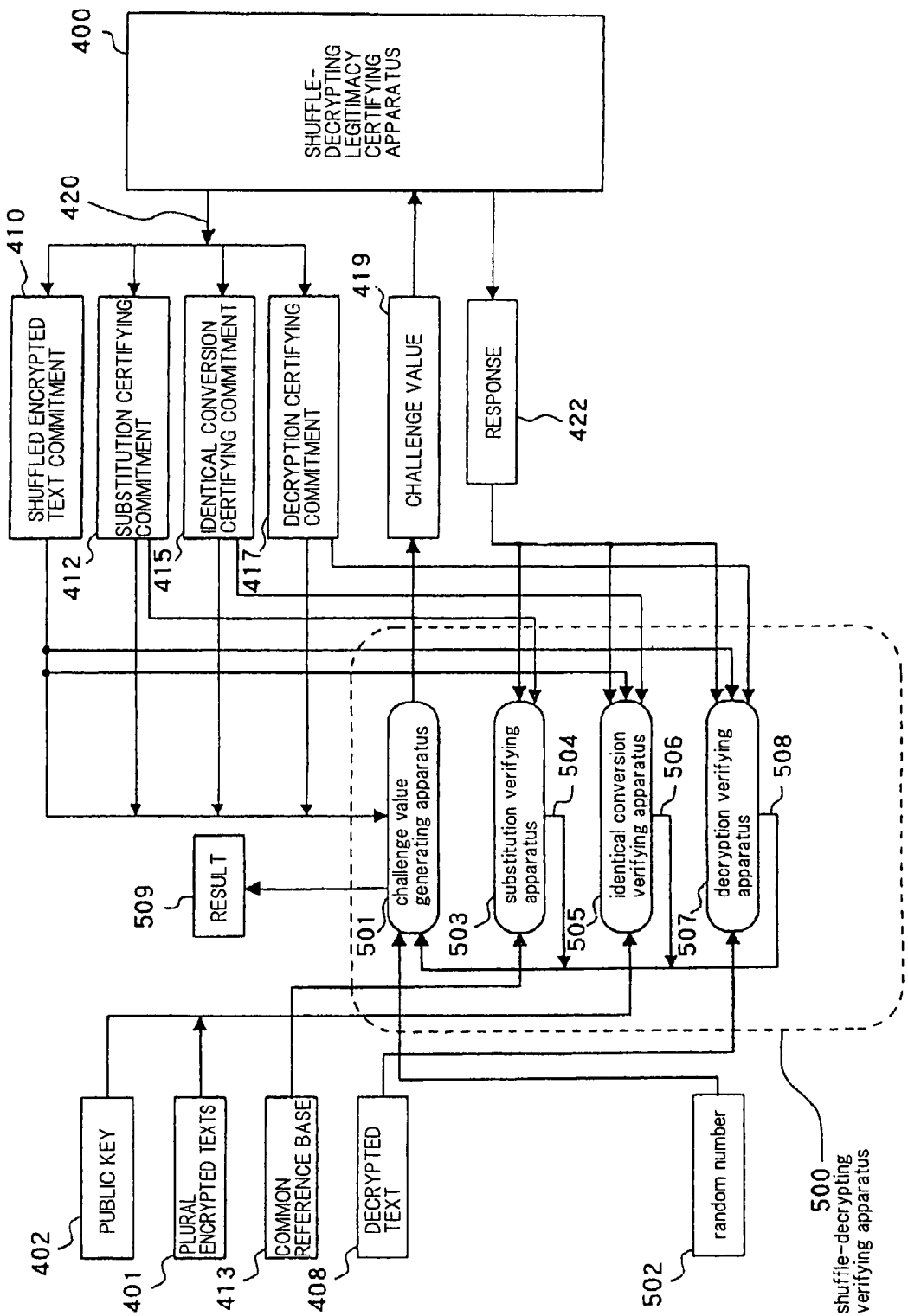
FIG. 5 is a diagram showing an arrangement of a shuffle-decrypting verifying apparatus according to an embodiment of the present invention.

Shuffle-decrypting verifying apparatus 500 shown in FIG. 5 is supplied with a plurality of encrypted texts 401, public keys 402, decrypted texts 408, random number 502, common reference base 413, shuffled encrypted text commitment 410, substitution certifying commitment 412, identical conversion certifying commitment 415, decryption certifying commitment 417, and response 422, and outputs challenge value 419 and result 509. Shuffle-decrypting verifying apparatus 500 comprises challenge value generating apparatus 501, substitution verifying apparatus 503, identical conversion verifying apparatus 505, and decryption verifying apparatus 508.

Shuffle-decrypting verifying apparatus 500 is implemented by a general computer system including an input device, an output device, a memory, and a controller. Challenge value generating apparatus 501, substitution verifying apparatus 503, identical conversion verifying apparatus 505, and decryption verifying apparatus 508 are virtually constructed in the computer system. Each of the components will be described in detail below.

[Challenge Value Generating Apparatus 501]

Public keys 402: ($G_0, M_0, Y$), encrypted texts 401: ($G_1, M_1$) (i=1, ..., n), and decrypted texts 408: ($G'_i, M'_i$) (i=1, ..., n) are input to challenge value generating apparatus 501. Random number 502 is also input to challenge value generating apparatus 501.

Challenge value generating apparatus 501 waits for shuffle-decrypting certifying commitment 420 to be sent from shuffle-decrypting certifying apparatus 400. As soon as challenge value generating apparatus 501 receives shuffle-decrypting certifying commitment 420, it sends challenge values 419: $c\_I \epsilon Z_q$ (i=1, ..., n) generated from random number 502 to shuffle-decrypting legitimacy certifying apparatus 400.

Challenge value generating apparatus 501 waits for shuffle-decrypting certifying response 422 to be sent from shuffle-decrypting certifying apparatus 400. When shuffle-decrypting certifying response 422 is sent to challenge value generating apparatus 501, the following three verifying apparatus are operated:

[Substitution Verifying Apparatus 503]

Substitution verifying apparatus 503 randomly select $d \epsilon Z_q$ from input random number 502, and confirms that the following equations are satisfied:

$$\Sigma v_{=-4}{}^n [rv + dr'v]Fv = F'_0 + [d]F''_0 + \Sigma_{i=1}{}^n [c_i + dc_i^2]F'_i$$

$$\Sigma_{j=1}{}^n [r_j^3 - c_j^3] = r_{-3} + r'_{-4} + w \mod q$$

If all these equations are satisfied, then substitution verifying apparatus 503 outputs "legitimate" as output 504. If all these equations are not satisfied, then substitution verifying apparatus 503 outputs "illegitimate" as output 504.

[Identical Conversion Verifying Apparatus 505]

Identical conversion verifying apparatus 505 confirms that the following equations are satisfied:

$$\Sigma v_{=0}{}^n [rv]Gv = \Sigma \mu_{=0}{}^n [c\mu]G'\mu$$

$$\Sigma v_{=-1}{}^n [rv]Mv = \Sigma \mu_{=0}{}^n [c\mu]N\mu$$

If these equations are satisfied, then identical conversion verifying apparatus 505 outputs "legitimate" as output 506. If these equations are not satisfied, then identical conversion verifying apparatus 505 outputs "illegitimate" as output 506.

[Decryption Verifying Apparatus 507]

Decryption verifying apparatus 507 confirms that the following equations are satisfied:

$$[r_{-1}]M_{-1} + \Sigma_{i=1}{}^n [r''_i]G'_i = N' + \Sigma_{i=1}{}^n [c_i](N_i - M'_i)$$

$$[r''_i]G_0 = [c_i]Y + Y'_i$$

If these equations are satisfied, then decryption verifying apparatus 507 outputs "legitimate" as output 508. If these equations are not satisfied, then decryption verifying apparatus 507 outputs "illegitimate" as output 508.

If all the outputs of the above three apparatus, i.e., the substitution verifying apparatus, the identical conversion verifying apparatus, and the decryption verifying apparatus are "legitimate", then the shuffle-decrypting verifying apparatus outputs "legitimate" as output 509. If even one of the outputs of the above three apparatus is "illegitimate", then the shuffle-decrypting verifying apparatus outputs "illegitimate" as output 509.

As described above, each of shuffle-decrypting legitimacy certifying apparatus 400 and shuffle-decrypting verifying apparatus 500 is implemented by a general computer system.

According to the present invention, shuffling apparatus 405, decrypting apparatus 406, shuffled encrypted text commitment apparatus 409, substitution certifying commitment apparatus 411, identical conversion certifying commitment apparatus 414, decryption certifying commitment apparatus 416, challenge value acquiring apparatus 418, and response apparatus 421 are virtually constructed in the computer system. Challenge value generating apparatus 501, substitution verifying apparatus 503, identical conversion verifying apparatus 505, and decryption verifying apparatus 508 include a program for virtually constructing these apparatuses in the computer system, and a recording medium for storing the program.

The invention claimed is:

1. A shuffle-decrypting legitimacy certifying apparatus comprising:
    an input device receiving a plurality of encrypted texts, a public key, a decrypting secret key, and a random number, said plurality being a number greater than one;
    an output device;
    a memory;
    a controller;
    one or more modules operable to encrypt the encrypted texts with the public key, shuffle the order of the encrypted texts, generate a plurality of decrypted texts produced by decrypting the encrypted texts with the secret key, and certify legitimacy of the encryption, the shuffling of the order, and the decryption to a shuffle-decrypting verifying apparatus;
    a challenge value generating apparatus waiting for a shuffle-decrypting certifying commitment comprising a substitution certifying commitment including a commitment of a plurality of shuffled encrypted texts and a shuffle commitment, an identical conversion certifying commitment, and a decryption certifying commitment, to be sent from said shuffle-decrypting certifying apparatus, selecting a random number having a given length as a challenge value when said shuffle-decrypting certifying commitment is received, and sending the selected challenge value to said shuffle-decrypting legitimacy certifying apparatus;
    a substitution verifying apparatus receiving said shuffle commitment, said substitution certifying commitment, a response, and said challenge value, and for generating a verifying result indicating either "legitimate" or "illegitimate" depending on whether the shuffle commitment is a commitment of substitution or a random number for encryption;
    an identical conversion verifying apparatus receiving said identical conversion certifying commitment, said encrypted texts, the commitment of said shuffled encrypted texts, said public key, said response, and said challenge value, and generating a verifying result indicative of either "legitimate" or "illegitimate" depending on whether the committed shuffled encrypted texts are shuffled using the committed substitution or the committed random number for encryption; and
    a decryption verifying apparatus receiving said decryption certifying text, commitment of said shuffled encrypted texts, said decrypted texts, said public key, said response, and said challenge value, and generating a verifying result indicative of either "legitimate" or "illegitimate" depending on whether the committed shuffled encrypted texts are decrypted into said decrypted texts,
    wherein data to communicate with said shuffle-decrypting verifying apparatus includes a number greater than one of shuffled encrypted text commitments, each of which is produced using the random number as an encrypted text by encrypting the encrypted texts with said public key and shuffling the order thereof, and the number of shuffled encrypted text commitments equals the number of encrypted texts received by the input device, and
    if all the verifying results from said substitution verifying apparatus, said identical conversion verifying apparatus, and said decryption verifying apparatus represent "legitimate", then a verifying result indicating "legitimate", that represents that said shuffled decrypted texts are produced by properly shuffle-decrypting said encrypted tests, is output, and if even one of said verifying results represents "illegitimate", then a verifying result indicative of "illegitimate" is output.

2. The shuffle-decrypting legitimacy certifying apparatus according to claim 1, comprising:
    a shuffling apparatus receiving said encrypted texts, said public key, and said random number, encrypting the encrypted texts with the public key, shuffling the order of the encrypted texts, and outputting a plurality of shuffled encrypted texts produced as a result;
    a decrypting apparatus receiving the shuffled encrypted texts and said secret key, decrypting the shuffled encrypted texts with said secret key, and outputting a plurality of decrypted texts produced as a result; and
    a shuffled encrypted text commitment apparatus receiving the shuffled encrypted texts and the random number, generating a commitment of the shuffled encrypted texts, and outputting a shuffled encrypted text commitment produced as a result using the random number.

3. The shuffle-decrypting legitimacy certifying apparatus according to claim 2, comprising:
    a substitution certifying commitment apparatus receiving said random number, generating a shuffle commitment which is a commitment with respect to a substitution representing an association between the order of the encrypted texts to be shuffled and the shuffled order of the encrypted texts and the random number for encryption, generating a substitution certifying commitment comprising the shuffle commitment and a commitment of the certification of the knowledge of the committed substitution and the committed random number for encryption, and outputting said substitution certifying commitment;
    an identical conversion certifying commitment apparatus receiving said encrypted texts, said public key, the commitment of the shuffled encrypted texts, and the random number, and generating and outputting an identical conversion certifying commitment which is a commitment of certification indicating that the committed shuffled encrypted texts are generated by shuffling the encrypted texts using the substitution and the random number for encryption which are committed by said shuffle commitment;
    a decryption certifying commitment apparatus receiving the commitment of the shuffled encrypted texts, said decrypted texts, said secret key, and the random number, and generating a decryption certifying commitment which is a commitment of a certification indicating that the committed shuffled encrypted texts are decrypted into said decrypted texts by said secret key;
    a challenge value acquiring apparatus sending a shuffle-decrypting certifying commitment comprising the commitment of the shuffled encrypted texts, said shuffle commitment, said substitution certifying commitment, said identical conversion certifying commitment, and said decryption certifying commitment, to said shuffle-decrypting verifying apparatus, and waiting for and receiving a challenge value as a sequence of random numbers from said shuffle-decrypting verifying apparatus; and a response generating apparatus generating said response which is represented by data that can be calculated from data including said challenge value, said random number, and said secret key, and sending the generated response to said shuffle-decrypting verifying apparatus.

4. A shuffle-decrypting verifying apparatus comprising:

an input device receiving a number greater than one of encrypted texts, a plurality of decrypted texts, a public key, and a random number;

an output device;

a memory;

a controller;

one or more modules operable to verify the legitimacy by a shuffle-decrypting legitimacy certifying apparatus of a certification indicating that the decrypted texts are data produced by encrypting the encrypted texts, shuffle the order thereof, and decrypt the encrypted texts with a secret key corresponding to said public key;

a challenge value generating apparatus waiting for a shuffle-decrypting certifying commitment comprising a substitution certifying commitment including a commitment of a plurality of shuffled encrypted texts and a shuffle commitment, an identical conversion certifying commitment, and a decryption certifying commitment, to be sent from said shuffle-decrypting certifying apparatus, selecting a random number having a given length as a challenge value when said shuffle-decrypting certifying commitment is received, and sending the selected challenge value to said shuffle-decrypting legitimacy certifying apparatus;

a substitution verifying apparatus receiving said shuffle commitment, said substitution certifying commitment, a response, and said challenge value, and for generating a verifying result indicating either "legitimate" or "illegitimate" depending on whether the shuffle commitment is a commitment of substitution or a random number for encryption;

an identical conversion verifying apparatus receiving said identical conversion certifying commitment, said encrypted texts, the commitment of said shuffled encrypted texts, said public key, said response, and said challenge value, and generating a verifying result indicative of either "legitimate" or "illegitimate" depending on whether the committed shuffled encrypted texts are shuffled using the committed substitution or the committed random number for encryption; and a decryption verifying apparatus receiving said decryption certifying text, commitment of said shuffled encrypted texts, said decrypted texts, said public key, said response, and said challenge value, and generating a verifying result indicative of either "legitimate" or "illegitimate" depending on whether the committed shuffled encrypted texts are decrypted into said decrypted texts, wherein data to communicate with said shuffle-decrypting legitimacy certifying apparatus includes a number greater than one of shuffled encrypted text commitments, each of which is produced using the random number as an encrypted text by encrypting the encrypted texts with said public key and shuffling the order thereof, and the number of shuffled encrypted text commitments equals the number of encrypted texts received, and if all the verifying results from said substitution verifying apparatus, said identical conversion verifying apparatus, and said decryption verifying apparatus represent "legitimate", then a verifying result indicating "legitimate", that represents that said shuffled decrypted texts are produced by properly shuffle-decrypting said encrypted tests, is output, and if even one of said verifying results represents "illegitimate", then a verifying result indicative of "illegitimate" is output.

5. A shuffle-decrypting legitimacy certifying method comprising steps of:

receiving a number greater than one of encrypted texts, a public key, a decrypting secret key, and a random number;

encrypting, using a controller, the encrypted texts with the public key;

shuffling, using the controller, the order of the encrypted texts;

generating, using the controller, a plurality of decrypted texts produced by decrypting the encrypted texts with the secret key;

certifying, using the controller, legitimacy of the encryption, the shuffling of the order, and the decryption to a shuffle-decrypting verifying apparatus, the step of waiting for a shuffle-decrypting certifying commitment comprising a substitution certifying commitment including a commitment of a plurality of shuffled encrypted texts and a shuffle commitment, an identical conversion certifying commitment, and a decryption certifying commitment, to be sent from said shuffle-decrypting certifying apparatus, selecting a random number having a given length as a challenge value when said shuffle-decrypting certifying commitment is received, and sending the selected challenge value to said shuffle-decrypting certifying commitment;

the substitution verifying step of receiving said shuffle commitment, said substitution certifying commitment, a response, and said challenge value, and generating a verifying result indicating either "legitimate" or "illegitimate" depending on whether the shuffle commitment is a commitment of substitution or a random number for encryption;

the identical conversion verifying step of receiving said identical conversion certifying commitment, said encrypted texts, the commitment of said shuffled encrypted texts, said public key, said response, and said challenge value, and generating a verifying result indicative of either "legitimate" or "illegitimate" depending on whether the committed shuffled encrypted texts are shuffled using the committed substitution or the committed random number for encryption; and the decryption verifying step of receiving said decryption certifying text, commitment of said shuffled encrypted texts, said decrypted texts, said public key, said response, and said challenge value, and generating a verifying result indicative of either "legitimate" or "illegitimate" depending on whether the committed shuffled encrypted texts are decrypted into said decrypted texts, wherein data to communicate with said shuffle-decrypting verifying apparatus includes a number greater than one of shuffled encrypted text commitments, each of which is produced using the random number as an encrypted text by encrypting the encrypted texts with said public key and shuffling the order thereof, and the number of shuffled encrypted text commitments equals the number of encrypted texts received, and if all the verifying results from said substitution verifying step, said identical conversion verifying step, and said decryption verifying step represent "legitimate", then a verifying result indicating "legitimate", that represents that said shuffled decrypted texts are produced by properly shuffle-decrypting said encrypted tests, is output, and if even one of said verifying results represents "illegitimate", then a verifying result indicative of "illegitimate" is output.

6. The shuffle-decrypting legitimacy certifying method according to claim 5, further comprising the steps of:
- receiving said encrypted texts, said public key, and said random number, encrypting the encrypted texts with the public key, shuffling the order of the encrypted texts, and outputting a plurality of shuffled encrypted texts produced as a result;
- receiving the shuffled encrypted texts and said secret key, decrypting the shuffled encrypted texts with said secret key, and outputting a plurality of decrypted texts produced as a result; and
- receiving the shuffled encrypted texts and the random number, generating a commitment of the shuffled encrypted texts, and outputting a shuffled encrypted text commitment which is produced as a result using the random number.

7. The shuffle-decrypting legitimacy certifying method according to claim 6, further comprising the steps of:
- receiving said random number, generating a shuffle commitment which is a commitment with respect to a substitution representing an association between the order of the encrypted texts to be shuffled and the shuffled order of the encrypted texts and said random number for encryption, generating a substitution certifying commitment comprising the shuffle commitment and a commitment of the certification of the knowledge of the committed substitution and said committed random number for encryption, and outputting said substitution certifying commitment;
- receiving said encrypted texts, said public key, the commitment of the shuffled encrypted texts, and said random number, and generating and outputting an identical conversion certifying commitment which is a commitment of a certification indicating that the committed shuffled encrypted texts are generated by shuffling the encrypted texts using the substitution and said random number for encryption which are committed by said shuffle commitment;
- receiving the commitment of the shuffled encrypted texts, said decrypted texts, said secret key, and said random number, and generating a decryption certifying commitment which is a commitment of a certification indicating that the committed shuffled encrypted texts are decrypted into said decrypted texts by said secret key;
- sending a shuffle-decrypting certifying commitment comprising the commitment of the shuffled encrypted texts, said shuffle commitment, said substitution certifying commitment, said identical conversion certifying commitment, and said decryption certifying commitment, to said shuffle-decrypting verifying apparatus, and waiting for and receiving a challenge value as a sequence of random numbers from said shuffle-decrypting verifying apparatus; and
- generating said response which is represented by data that can be calculated from data including said challenge value, said random number, and said secret key, and sending the generated response to said shuffle-decrypting verifying apparatus.

8. A shuffle-decrypting verifying method, comprising steps of:
- receiving a number greater than one of encrypted texts, a plurality of decrypted texts, a public key, and a random number; and
- verifying, using a controller, legitimacy by a shuffle-decrypting legitimacy certifying apparatus of certification indicating that the decrypted texts are data produced by encrypting the encrypted texts, shuffling the order thereof, and decrypting the encrypted texts with a secret key corresponding to said public key,
- the step of waiting for a shuffle-decrypting certifying commitment comprising a substitution certifying commitment including a commitment of a plurality of shuffled encrypted texts and a shuffle commitment, an identical conversion certifying commitment, and a decryption certifying commitment, to be sent from said shuffle-decrypting certifying apparatus, selecting a random number having a given length as a challenge value when said shuffle-decrypting certifying commitment is received, and sending the selected challenge value to said shuffle-decrypting certifying commitment;
- the substitution verifying step of receiving said shuffle commitment, said substitution certifying commitment, a response, and said challenge value, and generating a verifying result indicating either "legitimate" or "illegitimate" depending on whether the shuffle commitment is a commitment of substitution or a random number for encryption;
- the identical conversion verifying step of receiving said identical conversion certifying commitment, said encrypted texts, the commitment of said shuffled encrypted texts, said public key, said response, and said challenge value, and generating a verifying result indicative of either "legitimate" or "illegitimate" depending on whether the committed shuffled encrypted texts are shuffled using the committed substitution or the committed random number for encryption; and
- the decryption verifying step of receiving said decryption certifying text, commitment of said shuffled encrypted texts, said decrypted texts, said public key, said response, and said challenge value, and generating a verifying result indicative of either "legitimate" or "illegitimate" depending on whether the committed shuffled encrypted texts are decrypted into said decrypted texts,
- wherein data to communicate with said shuffle-decrypting legitimacy certifying apparatus includes a number greater than one of shuffled encrypted text commitments, each of which is produced using the random number as an encrypted text by encrypting the encrypted texts with said public key and shuffling the order thereof, and the number of shuffled encrypted text commitments equals the number of encrypted texts received, and
- if all the verifying results from said substitution verifying step, said identical conversion verifying step, and said decryption verifying step represent "legitimate", then a verifying result indicating "legitimate", that represents that said shuffled decrypted texts are produced by properly shuffle-decrypting said encrypted tests, is output, and if even one of said verifying results represents "illegitimate", then a verifying result indicative of "illegitimate" is output.

9. A non-transitory computer readable storage medium storing a program of instructions on a computer and executable by the computer to enable the computer to execute the steps of the method accordion to any one of claims 5-7.

* * * * *